Fig. 1.

TABLE OF APPLICABLE ISOMERS

| 1 | 2 | 3 | 4 | 5 | 6 | 7 | 8 | 9 | 10 | 11 | 12 | 13 |
|---|---|---|---|---|---|---|---|---|---|---|---|---|
| ISOMER | TARGET ISOTOPE | PRODUCTION CROSS SECTIONS (BARNS) | | HALF LIVES * | | TRANSITION ENERGY | | | | | | |
| | | $\sigma_2$ | $\sigma_1$ | $T_2$ | $T_1$ | $E_{21}$ kev | $\beta$ | $\alpha$ | $g_2$ | $g_1$ | $\sigma_{max}$ (BARNS) | $\sigma_0$ (BARNS) |
| $Zn^{69}$ | $Zn^{68}$ | .083 | 1.12 | 14h | 55m | 435 | 1 | .06 | 10 | 2 | 3800 | 10.0 |
| $Cd^{113}$ | $Cd^{112}$ | .03 | .23 | 14y | $3X10^{15}$y | 265 | (.01 photons per 100 betas) | | 12 | 2 | 216 | 36 |
| $In^{114}$ | $In^{113}$ | 56 | 2 | 50d | 72s | 192 | .965 | ≃4.5 | 11 | 3 | ≃.73 | 64 |
| $Cd^{115}$ | $Cd^{114}$ | .14 | 1.1 | 43d | 2.3d | 180 | 0 | | 12 | 2 | | 69 |
| $Sn^{121}$ | $Sn^{120}$ | .001 | .14 | >5y | 27h | ≃50 | 0 | | 12 | 4 | | |
| $Te^{127}$ | $Te^{126}$ | .09 | 1.03 | 105d | 9.3h | 89 | .985 | | 12 | 4 | | 510 |
| $Te^{129}$ | $Te^{128}$ | .015 | .178 | 33d | 67m | 106 | .95 | ≃∞ | 12 | 4 | ≃0 | 320 |
| $Te^{131}$ | $Te^{130}$ | .008 | .161 | 1.2d | 25m | 182 | .19 | | 12 | 4 | | |
| $Xe^{131}$ | $Xe^{130}$ | | | 12d | ∞ | 164 | 1 | ≃45 | 12 | 4 | ≃6000 | 128 |
| $Xe^{133}$ | $Xe^{132}$ | | .2 | 2.3d | 5.3d | 233 | 1 | 6.4 | 12 | 4 | 13000 | 61 |
| $Ba^{135}$ | $Ba^{134}$ | | | 29h | ∞ | 268 | 1 | ≃5.7 | 12 | 4 | ≃15,800 | 52 |
| $Ce^{137}$ | $Ce^{136}$ | .6 | 6.3 | 34h | 8.7h | 254 | .994 | ≃73 | 12 | 4 | ≃2810 | 64 |
| $Ho^{166}$ | $Ho^{165}$ | | 60 | >30d | 27h | 200 | ≃0 | | | 1 | | |
| $Os^{187}$ | $Os^{186}$ | | | 39h | ∞ | | | | | 2 | | |
| $Os^{191}$ | $Os^{190}$ | | | 14h | 15d | 74 | 1 | | 4 | 10 | | |
| $Bi^{210}$ | $Bi^{209}$ | | .019 | $3X10^6$y | 5d | 250 | 0 | | 19 | 3 | | |

*Abbreviations used: y, year; d, day; h, hour; m, minute; s, seconds

Inventors:
George C. Baldwin,
John P. Neissel,
Lewi Tonks,
by Paul A. Frank
Their Attorney.

Feb. 8, 1966 G. C. BALDWIN ETAL 3,234,099

METHOD OF PREPARING A GAMMA RADIATION MATERIAL

Filed Feb. 6, 1963 4 Sheets-Sheet 2

Inventors:
George C. Baldwin,
John P. Neissel,
Lewi Tonks,
by Paul A. Frank
Their Attorney.

Inventors:
George C. Baldwin,
John P. Neissel,
Lewi Tonks,
by Paul A. Frank
Their Attorney.

Feb. 8, 1966 G. C. BALDWIN ETAL 3,234,099

METHOD OF PREPARING A GAMMA RADIATION MATERIAL

Filed Feb. 6, 1963 4 Sheets-Sheet 4

Inventors:
George C. Baldwin,
John P. Neissel,
Lewi Tonks,
by Paul A. Frank
Their Attorney.

United States Patent Office 3,234,099
Patented Feb. 8, 1966

3,234,099
METHOD OF PREPARING A GAMMA RADIATION MATERIAL

George C. Baldwin, John P. Neissel, and Lewi Tonks, Schenectady, N.Y., assignors to General Electric Company, a corporation of New York Filed Feb. 6, 1963, Ser. No. 256,613
2 Claims. (Cl. 176—16)

Our invention relates to a method for amplifying the intensity of gamma radiation from radioactive nuclei and, in particular, to a gamma radiation source having an output characterized by energy, directionality, and coherence, and operated by means of a stimulated-emission photon-chain-reaction, and a method for producing the radioactive material used therein.

Upon being "excited" in a particular way (typically by electrical means), many substances can be made to give off extremely penetrating radiations—X-rays and gamma rays. Because X-rays can be reasonably focused and controlled, they have proved highly useful both in diagnosis and treatment of diseases and in industrial applications such as detection of hidden flaws within materials. Gamma rays, on the other hand, while their use would be highly advantageous from several viewpoints, have been found relatively less controllable than X-rays as to both their generation and directivity. For this reason, they have heretofore been of only minor use to mankind. A principal object of the present invention is to provide a method and means by which a profuse supply of gamma rays, controllable as to directivity, can be produced.

X-rays are typically produced by bombarding a metal target with a high energy beam of electrons. A promising source of gamma rays are certain radioactive materials, such as zinc$^{69}$, cadmium$^{113}$, and xenon$^{131}$, which by virtue of their radioactivity spontaneously release such rays. However, the intensity of radiation so realized is low and its direction is not effectively controllable. It has been speculated that the intensity of gamma radiation from radioactive materials might be enhanced by boosting the rate of nuclear decay of such material at the time the radiation is to be usefully employed. However, no method has previously been known, or apparatus available, for accomplishing this result. It is, therefore, a more specific object of our invention to provide a new gamma radiation source apparatus and method of production thereof wherein gamma radiation activity may be increased when desired by accelerating the rate of nuclear decay.

It is a further object of our invention to develop a new gamma radiation source apparatus and method of production thereof for producing a stimulated-emission photon-chain-reaction whereby a directional and coherent beam of monoenergetic gamma radiation may be formed.

Another object of our invention is to develop a new method for preparing the radioactive material used within the apparatus.

Briefly stated, and in accordance with our invention in meeting the objects enumerated above, our method for producing a photon-chain-reaction by stimulated-emission of gamma radiation consists of irradiating a target isotope with nuclear radiation (e.g. neutrons, protons, etc.) to form a desired highly excited nuclear isomeric state of a selected isotope wherein (1) a high concentration of nuclei in their upper or excited isomeric state may be achieved and also (2) having a resonance cross section greater than its nonresonant absorption cross section for gamma radiation of the electromagnetic energy emitted in transitions between the upper and lower (ground) isomeric states. The desired nuclear isotope is separated from any other products of the irradiation process and from any unconverted target isotopes to obtain a highly purified form of the desired isomer wherefrom is then grown an elongated crystalline solid structure having crystalline properties characterized by a high relative probability for the crystal to undergo a particular mode of lattice vibration. The crystal is maintained at predetermined environmental conditions to prevent premature stimulated emission of gamma radiation therefrom. The environmental conditions are modified, at the time an output is desired, to initiate a directional stimulated-emission photon-chain-reaction of gamma radiation from the crystal. The apparatus for producing directional stimulated emission of gamma radiation consists of the elongated crystal wherein the photon chain reaction occurs, and means for controlling crystal environmental conditions such as temperature, gravitational, and magnetic fields. An auxiliary radiation source to provide the triggering action may also be employed.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawing, wherein:

FIGURE 1 is a table of target isotopes and particular nuclear isomers thereof and their characteristics which may be useful in accordance with our invention;

Figure 4:
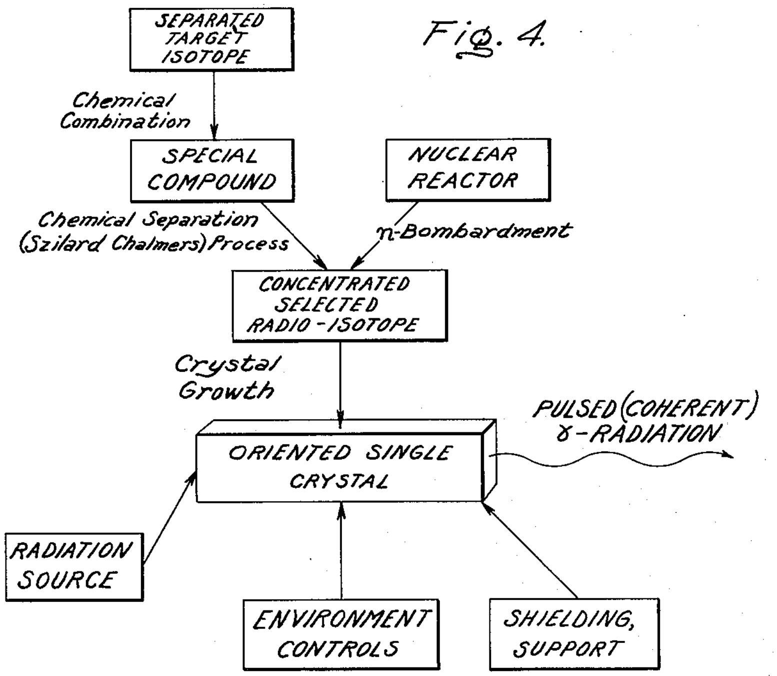
FIGURE 4 is a flow diagram illustrating the method steps required to produce a gamma radiation source in accordance with our invention.

It is commonly supposed that, in general, no significant modification of the rate of nuclear decay from the natural decay rate is possible. For a given quantity of radioactive material, a high decay rate is associated with short lifetime, the rate of decay being given by $$\frac{dN}{dt}=\frac{-N}{\tau}$$

N being the number of radioactive nuclei and $\tau$ their average life. Thus, the half life of radium is apparently insensitive to environmental conditions such as temperature, pressure, chemical combination, electric, magnetic, or gravitational fields and this observational fact is the basis for the dating methods whereby the ages of meteorites and archaelogical specimens can be determined through measurement of the extent to which the inexorable process of radioactive decay has advanced.

Nevertheless, it is also well known that under certain special conditions the decay rate of certain unusual nuclei can be modified. In particular, $U^{235}$ has a natural half-life of $7\times10^8$ years but this can be reduced to a few months in a nuclear reactor and to a small fraction of a second in a fission bomb wherein a process of neutron absorption and liberation effects a divergent neutron chain reaction.

An analogous chain reaction, involving electromagnetic (photon) rather than particle (neutron) radiation, may be employed as a means for accelerating the natural process of radioactive decay through emission of gamma radiation. Electromagnetic radiation of wavelength $\lambda$, frequency $\nu$, is emitted and absorbed in discrete quanta of energy, of amount $h\nu$, where $h$ is Planck's constant. The high frequency portion of the electromagnetic frequency spectrum of interest for our invention is the highly energetic radiation known as X-rays and gamma rays. Both X-rays and gamma rays occupy the same region of the frequency spectrum extending in quantum energy from about 1000 to several million electron volts. Gamma radiation has its origin in the motion of electrically charged particles within atomic nuclei, whereas X-radiation originates in motion of electrons in the outer regions of the atom. Gamma radiation is always of discrete, sharp frequency, whereas X-radiation is often continuously distributed over a wide range of frequencies. The controlled liberation of nuclear energy in the form of gamma radiation by means of a photon chain reaction under certain special conditions utilizes a process known as stimulated emission of radiation. A similar basic physical process underlies the operation of devices commonly known as masers and lasers wherein microwave and light amplification respectively are effected by a stimulated emission of radiation. Our invention may thus be described as a GRASER (gamma ray amplification by stimulated emission of radiation).

It is well known that atomic and nuclear systems possess discrete or quantized energy levels or states, and that transitions between these states occur whenever electromagnetic radiation of the correct frequency is simultaneously emitted (exothermic transition) or absorbed (endothermic transition). The characteristic optical line spectra of atoms result from transitions between energy states in the outer electron shells of the atom; whereas, X-ray spectra result from transitions involving the inner, more tightly bound electron shells; and gamma radiation results from transitions between states within the nucleus.

Exothermic transitions, under ordinary conditions, occur entirely at random and the process is termed "spontaneous emission" or decay. The two processes, absorption and spontaneous emission, by themselves offer no opportunity for modifying or controlling the rate of nuclear decay by gamma ray emission. However, an additional process, "stimulated emission," exists which is exothermic and wherein the transitions from an upper to a lower state involve the emission of electromagnetic radiation of frequency indistinguishable from that emitted spontaneously; this is a coherent process, the emitted photon having the same phase as the incident photon, and depends on frequency in the same way as the resonant absorption of radiation by a nucleus in its lower state, although the stimulating photon is not actually absorbed in this process.

The ratio of stimulated emissions to spontaneous emissions depends on the density of photons present which are capable of stimulating emission. This is ordinarily low. Moreover, most nuclei in a sample of ordinary matter are in their lower states, so that attenuation by absorption rather than amplification by stimulated emission will ordinarily predominate in a beam of gamma rays. Nevertheless, conditions wherein stimulated emission becomes the dominant process have been achieved in the case of atomic and molecular transitions in the optical and microwave regions and the realization of conditions to permit extension of this phenomenon to the gamma ray region is the end to which our present invention is directed. Conditions which enable stimulated emission between two nuclear states to predominate over absorption and so permit radiation levels to be achieved which are significantly greater than in spontaneous emission alone must be achieved. To this end, substances are employed in which a large fraction of nuclei are in the proper excited state, extraneous or nonresonant interaction processes are kept at a minimum and finally, environmental conditions favoring emission at a single sharp frequency are established. A divergent photon chain reaction may thus be achieved, analogous to the divergent neutron chain reaction in fissile material, by a suitable initiating process, by which the gamma ray intensity is multiplied to an extent which is limited only by the active length of the selected substance in the desired direction.

All devices employing chain reactions of stimulated emission events require at least (1) a substance whose atoms or nuclei contain a pair of combining energy levels (an excited or upper level and a ground or lower level of a particular isomeric nuclei) separated in energy by an amount E proportional to the frequency of the radiation to be generated or amplified in accordance with Planck's equation $E=h\nu$; (2) some means of pumping or exciting this substance to such an extent that a large fraction of the atoms or nuclei are in the upper level; and (3) provision to insure that absorption or loss at the operating frequency is below a critical value. These three conditions must also be met in a device employing chain reactions of stimulated emission of gamma radiation.

Figure 3:
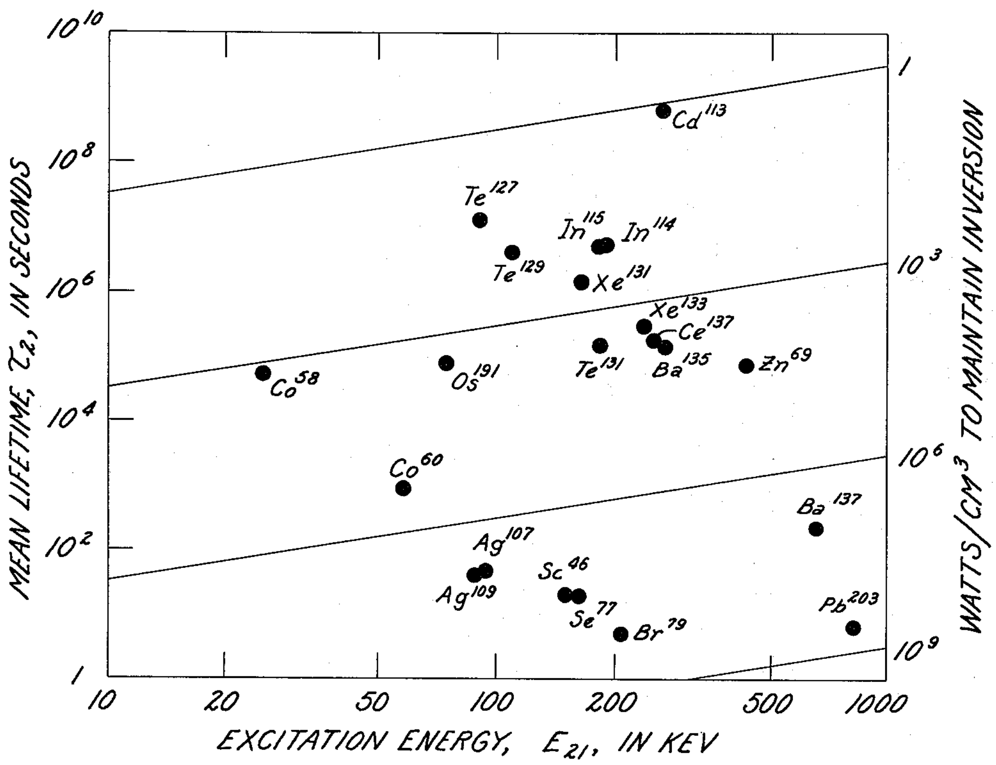
FIGURE 3 is a graph of the energy states and energy storage properties of selected emitters of X and gamma radiation.

The first of the aforementioned requirements concerns an inherent property of isotopes and a reference to the table of FIGURE 1, column 7, designated as $E_{21}$, the transition energy, or to FIGURE 3, indicates that the first requirement is met by selecting any of a number of appropriate isotopes.

To meet the third requirment necessitates a determination of the criteria for stimulated emission to predominate over absorption.

In any two-level quantized system with $N_2$ atoms per unit volume in an upper energy level or state, and $N_1$ in the lower state, which can make transitions only by absorbing or emitting radiation of a single frequency $\nu$ or wavelength $\lambda$, the atom population balance is described by the equation $$\frac{dN_1}{dt}=-\frac{dN_2}{dt}=A_{21}\left[N_2+U_\nu(N_2-g_2/g_1N_1)\frac{\lambda^3}{8\pi h}\right] \quad (1)$$

wherein the first term, $A_{21}N_2$, describes the spontaneous decays or number of spontaneous emission events, and the second term describes the excess of stimulated emission events over resonant absorption events. The quantity $U_\nu$ is the energy density per unit frequency bandwidth of the radiation at the wavelength $\lambda$ corresponding to the transition energy $E_{21}$ between the energy states 2 and 1. As downward transitions take place, photons are added to the emitted radiation field, increasing the energy density. The quantities $g_2$ and $g_1$ are the respective statistical weights of the two states.

Equation 1 predicts that an excess of stimulated emission over resonant absorption occurs only if, by some means, an initial excess of upper state atoms, ordinarily termed an inversion of population, is provided, and that this excess will diminish with time unless the same means is again invoked to restore an inversion of population. This equation is in the form in which the second requirement noted above applies to stimulated emission devices in the microwave and optical wavelength regions. Inversion of population is not always required in the gamma ray region, since emission and resonant absorption may occur at different frequencies, as is more fully described hereinafter.

Because the energy density per unit bandwidth $U_\nu$ appears in Equation 1, it is necessary to take account of the frequency distribution of the radiation present in order to describe the growth of the radiation density. The emitted radiation is distributed over a region of the frequency or energy spectrum, the emission probability having maximum value at the energy $E_{21}$ or frequency $\nu$ corresponding to the energy difference between upper and lower states and decreasing to half at two neighboring energies differing by an amount $\Gamma_{21}$ called the natural line width. Thus, the frequency or energy distribution of an emission line relative to the emitting nucleus is described as having a full bandwidth or total line width, designated $\Gamma_{21}$ at half maximum, and having its maximum value at the transition energy $E_{21}$, wherein both E and Γ are measured in electron volts.

The natural level width of the upper or 2 state is designated $\Gamma_2$, and the total line width for the transition between the upper and lower state, $\Gamma_{21}$, is equal to the natural level width of the upper state plus the natural width of the lower state $\Gamma_1$. The mean lifetime $\tau_2$ of the upper state is determined by all possible transitions to all lower states including particle emission as well as radiation events. The gamma ray transition probability contribution to $\Gamma_2$ is described as a partial width, $\Gamma_{2\gamma}$, for radiation transition.

The probability per unit time for the spontaneous emission of a photon in the interval E to $E+dE$ is $$A[E,E_{21}]dE=\frac{4}{h}\frac{\Gamma 2\gamma}{\Gamma 21}\frac{dE}{1+4[E_{21}-E]^2/\Gamma_{21}^2} \qquad (2)$$

and the probability of all spontaneous transitions from state 2 to state 1 by photon emission is given by integrating this expression over the energy $$A_{21}=\int_0^\infty A[E,E_{21}]dE=\frac{2\pi\Gamma 2\gamma}{h} \qquad (3)$$

Thus, Equation 1 for the totality of all radiative transitions from state 2 to state 1 is generalized to $$\frac{dN_1}{dt}=-\frac{dN_2}{dt}=N_2\int_0^\infty A[E,E_{21}]dE+[N_2-g_2/g_1N_1]\int_0^\infty \frac{\lambda^3}{8\pi}En[E]A[E,E_{21}]dE \qquad (4)$$

wherein the term $En[E]$ replaces the energy density per unit frequency interval $U_\nu$, and is expressed in terms of the photon density per unit energy interval $n[E]$.

Emission and absorption events add and remove photons respectively, thereby changing the photon density, and the balance in each differential energy interval is obtained by subtracting losses by both resonant and non-resonant absorption from gains by spontaneous and stimulated emission.

$$\frac{d}{dt}n[E]=\frac{2\Gamma_{2\gamma}}{h\Gamma_{21}}\frac{1}{1+4[E_{21}-E]^2/\Gamma_{21}^2}\left[N_2+[N_2-g_2/g_1N_1\frac{\lambda^2}{4}\frac{hc}{2\pi}n[E]\right]-\sigma_0N_0cn[E] \qquad (5)$$

in which the last term accounts for depletion of the photon density in the range E to $E+dE$ by non-nuclear absorption of $N_0$ total atoms per unit volume with an average total cross section $\sigma_0$, and $c=\lambda\nu$, the velocity of light. This non-nuclear absorption term accounts for the removal of photons of nonresonant absorption process due entirely to interaction of the gamma ray with the external electrons of the atom in the energy region of interest and takes two forms, a photoelectric effect in which the binding of the electron to the atom plays an essential role and the Compton effect in which the electron may be regarded as being free. Both of these effects result in a transfer of energy and momentum; in the Compton effect, the photon is scattered with reduced energy and the electron recoils.

The factor $$\sigma(E,E_{21})\equiv\frac{\lambda^2}{4}\frac{\Gamma_{2\gamma}\Gamma_{21}}{2\pi}\frac{1}{[E-E_{21}]^2+\frac{\Gamma_{21}^2}{4}} \qquad (6)$$

appears in Equation 5 as a resonance cross section, not only for nuclear absorption, but also as the cross section for stimulated emission, at any particular sharply defined photon energy E.

Figure 2:
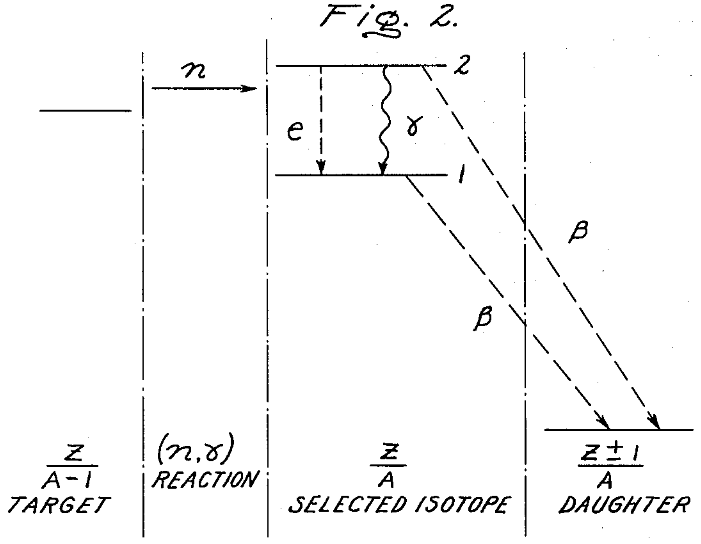
FIGURE 2 illustrates a typical energy level diagram for a nuclear isotope including a production reaction, two forms of isomeric level transition, and decay to a daughter isotope.

The relatively small energy differences between quantum states in masers and lasers can be removed only by radiation or by collision of molecules. In the X-ray and gamma ray regions, however, particle emission competes as an additional process of de-excitation since the energy of an excited state can often exceed the binding energy of a particle in the atom or nucleus. A first de-excitation process competing with nuclear gamma radiation is known as internal conversion, a nonelectromagnetic transition of a nucleus from an upper to a lower energy state accompanied by the ejection of an orbital electron. An internal conversion coefficient $\alpha$ is specified and defined as the ratio of electron ejection to gamma ray emission probabilities. A second competing de-excitation process occurs from a transition of a nucleus in an upper state by beta ray emission directly to a daughter nucleus. The branching ratio, $\beta$, is defined as the fraction of all decays (Z, A) to $(Z\pm 1, A)$ which proceed by first making the isomeric transition 2 to 1. The remaining fraction $(1-\beta)$ of upper state nuclei decay directly to the daughter nuclei $(Z\pm 1, A)$. Of the isomeric transitions 2 to 1, a fraction $$\frac{\alpha}{1+\alpha}$$

decay by internal conversion. FIGURE 2 illustrates these de-excitation processes and also a desired transition by gamma radiation in a typical isomeric energy level diagram. Nuclei in metastable energy levels, with experimentally measurable gamma ray emission lifetimes, are called isomeric nuclei or nuclear isomers. That is, nuclear isomers are distinct energy states or levels of a given nucleus or isotope. Thus, FIGURE 2 illustrates a two-level nuclear isotope (Z, A) which decays to the daughter nucleus $(Z\pm 1, A)$. The nuclear isotope (Z, A) which has been produced from a target isotope $(Z, A-1)$ by neutron irradiation is seen to de-excite from an upper energy level or state 2 to a lower energy state 1, either by internal conversion thereby emitting electron $e$ or by nuclear gamma radiation $\gamma$. The nucleus (Z, A) may decay from either of its two isomeric states, 2, 1, by positive or negative beta ray emission or orbital electron capture to a daughter nucleus $(Z\pm 1, A)$.

A particularly serious problem in the gamma radiation energy spectrum is the displacement or shift of the center frequency of an emission or absorption line by more than its natural width so that two nuclei may not appear to have the same resonant frequency. Many of these line shifts or displacements are caused by a well-known phenomenon known as the Doppler effect, arising from relative motion of source and observer. A particularly important instance of the Doppler effect occurs in free nuclei; the emission of a photon carrying energy E and momentum $E/c$ exerts a reaction on the source, imparting thereto an equal, opposite momentum. The energy actually carried by the photon is thereby reduced, below that furnished by the source transition $E_{21}$, by the energy of recoil. The same considerations apply to nuclear absorption, in which conservation of momentum still demands the same energy of recoil. Since it now must be provided by an incident photon, a diminished amount is available for the internal nuclear transition. Emission and absorption, therefore, do not occur at the same frequency in free nuclei. In a crystalline solid the nuclei are bound to a lattice wherein the thermal energy of the solid appears in lattice vibrations. The recoil from gamma ray emission is then shared with the entire lattice, in which it excites vibrations, the energy of which must be provided by the photon, as before. Doppler effect in crystals also produces a small displacement of the line center proportional to the mean square velocity of lattice vibration and therefore to the absolute temperature. Thus, temperature gradient is seen to be a critical environmental condition and should be kept low to minimize line shift. However, crystals made from isotopes exhibiting the Mössbauer effect emit without recoil; that is, with no change in lattice vibration resulting from gamma ray emission and thus no line shift occurs in this type crystal from such effect.

Other sources of line shift are the effect of gravitational field, and the Zeeman effect. In a gravitational field the energy and therefore the frequency of a photon emitted from a nucleus is increased by its gravitational potential energy, and may thus be out of resonance with another nucleus. This effect is eliminated if both nuclei are located in an orbiting satellite or freely falling body. The line shift due to gravitational field may also be eliminated when the two nuclei are at the same height and have equal accelerations. Thus, gravitational shift may be eliminated by positioning the source and other interacting nuclei at the same height; they may also be fully compensated by an appropriate relative velocity or temperature difference between the source and the other interacting nucleus.

The term Zeeman effect refers to a line splitting, associated with the splitting of a nuclear state into component substates, due to interaction between a nucleus and applied magnetic field. Zeeman splitting may be reduced by providing adequate magnetic shielding.

Compensation for Doppler and gravitational shifts and Zeeman splitting improves resonance between emission line and absorption line components, thereby aiding in initiating a stimulated emission photon chain reaction in a manner more fully described hereinafter. Conversely, noncompensation for the above-described effects is useful as a control mechanism in preventing a premature chain reaction.

The electromagnetic field in any finite volume of space contains an infinite number of modes of oscillation characterized by frequency, direction of propagation, and polarization, these modes being excited in quantum transitions. Stimulated emission is the addition of a quantum into the same mode of the radiation field as that of the quantum which induced the event, and the probability for its occurrence is directly proportional to the number of quanta already present in that particular mode. It thus follows that each chain of stimulated emissions can be regarded as a sequence of accurately aligned events in which indistinguishable photons are added to the chain with precisely the same frequency, phase, direction of propagation, and polarization as the first member of the chain, and that in a uniform medium each chain will grow in a random manner that can be statistically described as exponential with distance. Thus, the early stages of a photon chain, including the initiating spontaneous emission event, are of primary importance.

Denoting by $\phi d\omega$ the flux of photons per unit area and per second which are directed within an infinitesimal solid angle element $d\omega$ and taking $d\omega$ in the $x$-direction, the total photon flux density may be expressed by rewriting Equation 5, relating to spontaneous emission and the net effect of stimulated emission and absorption, in the form $$\frac{d\phi}{dx}=S+[K-\mu]\phi \qquad (7)$$

with S being the spontaneous emission source strength per unit volume directed within $d\omega$, K the probability per unit distance that a stimulated emission event will occur, and $\mu$ the absorption probability per unit distance.

Equations 5 and 7 are differential equations for the photon density and flux in a two-level medium, valid for the case of thermal equilibrium or for the ideal situation in which all gamma emission line displacements can be ignored. Because of the recoil effect hereinabove described which can displace the center frequencies of emission and absorption lines by more than the line width, a reformulation of each term of this equation must be derived before the general kinetic equation for a stimulated-emission photon-chain-reaction can be written and interpreted which will be valid in the energy region under consideration.

Before the emission of a gamma ray there are a number of nuclei in energy state 2 and the crystal lattice is in, say, the $i^{th}$ vibrational state; after emission, the number of nuclei in state 2 has been reduced by 1 and the lattice is in the $j^{th}$ vibrational state. Letting $E_i$ and $E_j$ be the corresponding lattice energies, the center gamma ray energy is $E_{ij}=E_{21}+E_i-E_j$ in any particular event. Thus, the spontaneously emitted photons in a crystalline solid constitute a spectrum of lines with discrete center frequencies $E_{ij}/h$, relative probabilities $P_{ij}$, and equal widths $\Gamma_{21}$. The spontaneous emission term is therefore a sum of components typified by $$P_{ij}N_{2i}A[E,E_{ij}]dE=p_{ij}N_{2i}\frac{\Gamma_{2\gamma}}{h}\Gamma_{21}\frac{dE}{[E-E_{ij}]^2+\frac{\Gamma_{21}^2}{4}} \qquad (8)$$

Stimulated emission occurs from the collision of an $ij$-type photon with a state 2 nucleus producing an addition $ij$-type photon and an $E_j-E_i$ phonon (recoil quantum) thus preserving energy and momentum and assuring coherence of the two photons. Hence, a typical stimulated emission term is $$P_{ij}N_{2i}cn[E]\sigma[E,\ E_{ij}]dE=p_{ij}\frac{\lambda^2}{8\pi}\frac{N_{2i}cn[E]\Gamma_{2\gamma}\Gamma_{21}}{[E-E_{ij}]^2+\frac{\Gamma_{21}^2}{4}} \qquad (9)$$

which reveals that a nucleus can be stimulated by an incident gamma ray whose frequency corresponds not to the internal transition energy of the nucleus, but rather corresponds to the internal energy diminished by an energy of recoil, which will be the energy of the emitted photon, hence the use of $E_{ij}$ rather than $E_{21}$ in the resonance denominator. In the case where $i=j$, we have recoilless or Mössbauer transitions. In the Mössbauer case, a population inversion of energy states is necessary for a stimulated chain reaction to occur, whereas in the non-Mössbauer case it is not necessary.

A typical resonant absorption term is $$-p_{ij}\delta_{ij}\frac{\lambda^2}{8\pi}\frac{N_{1i}cn[E]\Gamma_{2\gamma}\Gamma_{21}}{[E-E_{ij}]^2+\frac{\Gamma_{21}^2}{4}} \qquad (10)$$

which is similar to the stimulated emission term, Equation 9, but with an important new factor $\delta_{ij}[=0,\ ij;\ =1,\ i=j]$ and with $N_{1i}$ replacing $N_{2i}$.

The terms which account respectively for spontaneous, stimulated, and absorption events in Equation 5, which is the kinetic equation for the differential photon density $n$[E], are replaced by the aforementioned terms to form the equation $$\frac{dn[E]}{dt}=\sum_i\sum_j\left\{p_{ij}N_{2i}\frac{\Gamma_{2\gamma}\Gamma_{21}}{h}\left[1+\frac{\lambda^2}{4}\frac{hcn[E]}{2\pi}\right]\frac{1}{[E-E_{ij}{}^2+\frac{\Gamma_{21}^2}{4}}\right\}-\sum_i p_{ii}N_{1i}\frac{\lambda^2}{1\pi}\frac{g_2}{g_1}\frac{\Gamma_{2\gamma}\Gamma_{21}cn[E]}{[E-E_{ii}]^2+\frac{\Gamma_{21}^2}{4}}-\sigma_o N_o cn[E] \qquad (11)$$

which takes into account the effect of line shift from nuclear recoil and allows for distribution of initial vibrational as well as nuclear levels, treats $\lambda$ as essentially constant over the narrow range of E involved, and considers the natural line widths equal to $\Gamma_{21}$ for all transitions.

A typical component characterized by indices $i$ and $j$ obeys the balance equation $$\frac{dn_{ij}[E]}{dt}=\left[P_{ij}\left\{N_{2i}+\frac{\lambda^2}{8\pi}hcn_{ij}[E][N_{2i}-g_2/g_1\delta_{ij}N_{1i}]\right\}\frac{\Gamma_{2\gamma}\Gamma_{21}}{h}\frac{1}{[E-E_{ij}]^2+\frac{\Gamma_{21}^2}{4}}\right]-\sigma_o N_o cn_{ij}[E] \tag{12}$$

where the term $$\frac{\lambda^2}{8\pi}\frac{p_{ij}[N_{2i}-g_2/g_1\delta_{ij}N_{1i}]\Gamma_{2\gamma}\Gamma_{21}}{[E-E_{ij}]^2+\frac{\Gamma_{21}^2}{4}}-\sigma_o N_o$$

is the $[K-\mu]$ term of Equation 7.

Thus, to have a stimulated-emission photon-chain-reaction with events of type $ij$, the particular value of E for which the critical condition is most easily fulfilled is $E=E_{ij}$, the critical condition to be satisfied then being $$\frac{\lambda^2}{2\pi}\frac{\Gamma_{2\gamma}}{\Gamma_{21}}\frac{p_{ij}[N_{2i}-g_2/g_1N_{1i}\delta_{ij}]}{N_o}>\sigma_o \tag{13}$$

wherein the term $$\frac{\Gamma_{2\gamma}}{\Gamma_{21}}=\frac{\beta}{1+\alpha}\frac{\tau_1}{\tau_1+\tau_2} \tag{14}$$

expresses the branching ratio and internal conversion effects on the line width. The critical condition recited by Equation 13 may thus be expressed as $$\frac{\lambda^2}{2\pi}\frac{p_{ij}\beta}{1+\alpha}\frac{\tau_2}{\tau_1+\tau_2}\frac{N_{2i}-g_2/g_1N_{1i}\delta_{ij}}{N_o}>\sigma_o \tag{15}$$

The photon chain reaction is initiated by the injection or spontaneous emission of a photon having the correct energy, and once the spontaneous transitions establish initial conditions, they are promptly overwhelmed by the stimulated emission processes so that the spontaneous terms can be neglected in describing the later temporal course of $N_2$ and $N_1$. Further, in a crystalline solid, one particular type of transition characterized by the recoil indices $i$, $j$, will have the largest $[K-\mu]$ factor and, therefore, prevail over the others. This transition may be characterized by a particular direction of the impulse given by recoil, and thereby effect directionality of stimulated emission. The directionality is further enhanced by producing a geometrical configuration of the crystalline solid in the form of a long filament in a manner described in detail hereinafter.

The critical condition expressed by Equation 15 may be rewritten $$\frac{\sigma}{\sigma_o}>\frac{N_o}{[N_{2i}-g_2/g_1N_{1i}\delta_{ij}]p_{ij}}N_o \tag{16}$$

where $$\sigma=\frac{\lambda^2}{2\pi}\frac{\beta\tau_1}{[1+\alpha][\tau_1+\tau_2]} \tag{17}$$

is the maximum resonance cross section, a function only of the particular nuclear species being employed. Thus, it can be appreciated that it is not sufficient to find nuclear isotopes for which $\sigma \gtrsim \sigma_0$; the particular isotope must have a high fraction of all its nuclei in the upper state, and moreover, have crystal properties which lead to high $p_{ij}$ for at least one component of the recoil. Since most of the factors appearing in Equation 17 are unfavorable $[\alpha \geqq 0, \beta \leqq 1, \tau_1 < \tau_1+\tau_2]$ in most nuclear species, the proper selection of the species is very important. Further, since Equation 16 includes $N_o$, the total number of atoms of both the desired nuclear isomer and other substances, the active or desired isomer should be obtained in as pure a form as possible to reduce the magnitude of $N_o$ toward $N_{2i}$, thereby reducing contaminants and competing reactions.

The second requirement for obtaining chain reactions of stimulated emission events enumerated heretofore will now be considered. Radiative pumping, that is, direct irradiation of the lower isomer of the desired nuclear isotope at the transition energy to produce the upper isomer is possible in principle but practical considerations negate this approach since there presently exists no practical means of generating intense radiation in a narrow bandwidth at this energy level and the total power required to achieve the irradiation by broad bandwith radiation is extremely great.

A high concentration of the upper isomeric state of a desired nuclear isotope may be produced by particle bombardment or irradiation of another isotope. Population inversion may occur during the irradiation as a result of a favorable relationship among the cross sections for producing the respective states and their respective decay constants, or at some time after the irradiation in spite of an unfavorable ratio of creation cross sections, as a consequence of a favorable decay scheme and lifetime ratio.

It is assumed that the selected nuclear isomer to be produced has a decay scheme shown in FIGURE 2 and that both isomeric states 2, 1, can be generated by bombardment with some type of nuclear radiation of an appropriate target isotope. The assumptions can often be met by thermal neutron capture in a single target isotope. A target isotope is selected that is either stable or has a half life much longer than that of the irradiation products whereby its decay can be neglected.

The rate of change of the upper level population density of the selected isomer by neutron bombardment of a target isotope of population density $N_p$ is $$\frac{dN_2}{dT}=\sigma_2\phi N_p-\frac{N_2}{\tau_2} \tag{18}$$

in which $\phi$ is the neutron (or other particle) flux density and $\sigma_2$ the cross section for formation of the upper state by neutron capture (or other reaction).

A fraction $\beta$ of all upper state nuclei decay to form the lower state, and the lower state population density therefore changes according to $$\frac{dN_1}{dT}=\sigma_1\phi N_p+\frac{\beta N_2}{\tau_2}-\frac{N_1}{\tau_1} \tag{19}$$

Integrating Equations 18 and 19 with the initial conditions $N_1[T=0]=N_2[T=0]=0$ and forming the ratio $N_1/N_2$ determines the ratio of isomer state populations while in a reactor at any time T after the start of irradition $$\frac{N_1}{N_2}=\frac{\nabla-\Sigma e^{[-T/\tau_2]}-[\nabla-\Sigma]e^{[-T/\tau_1]}}{1-e^{[-T/\tau_2]}} \tag{20}$$

where $$\nabla=\frac{[\sigma_1+\beta\sigma_2]\tau_1}{\sigma_2\tau_2} \text{ and } \Sigma=\frac{\beta\tau_1}{\tau_2-\tau_1}$$

If the ratio $N_1/N_2$ is less than unity, an inversion exists; and for large T, $$\frac{N_1}{N_2}\rightarrow\nabla$$

therefore $1/\nabla$ is the maximum possible degree of inversion (e.g. ratio of excited state to ground state population) during irradiation. Even if $\nabla>1$, a delayed inversion will occur at a time after removal from the reactor, as thermal equilibrium is approached, if $\tau_2>\tau_1$.

Following removal from the reactor after exposure time, T, the population densities of the two states of the nuclear isomer are given by $$N_2[T+t]=N_2[T]e^{[-t/\tau_2]} \tag{21}$$

$$N_i[T+t]=N_1[T]e^{[-t/\tau_1]}+\frac{\beta N_2[T]\tau_1}{\tau_2-\tau_1}[e^{t-/\tau_2]}-e^{[-t/\tau_1]}] \tag{22}$$

in which $N_2[T]$ and $N_1[T]$ are found from the integrated forms of Equations 18 and 19. The ratio of the populations is $$\frac{N_1}{N_2}[T+t]=\frac{N_1}{N_2}[T]e^{[1/\tau_2-1/\tau_1]t}+\frac{\beta\tau_1}{\tau_2-\tau_1}[1-e^{[1/\tau_2-1/\tau_1]t}] \quad (23)$$

If T is long enough, $$\left(\frac{N_1}{N_2}[T]\right)$$

becomes $\nabla$ and Equation 23 becomes $$\frac{N_1}{N_2}[T+t]=\Sigma+[\nabla-\Sigma]e^{[1/\tau_2-1/\tau_1]t} \quad (24)$$

It can be seen from Equation 24 that when irradiation is carried to equilibrium, the time at which inversion occurs will be;

For $\tau_1>\tau_2$, at time of removal from reactor

For $\tau_1<\tau_2$, $\nabla<\Sigma$, at time of removal from reactor $\nabla>\Sigma$, after a time $$t>\frac{\tau_1\tau_2}{\tau_2-\tau_1}$$

The concentration of a selected nuclear isomer at the end of a suitable irradiation period is generally very low and it must be separated or isolated from the target isotope by extremely selective means to obtain a highly enriched or pure form. A well-known method of chemical isolation, applicable to this situation, is based on the fact that the high recoil energy accompanying a neutron irradiation reaction will rupture any chemical bond. The target isotope is therefore incorporated in a chemical compound, preferably one with covalent binding ($Zn[C_2H_5]_2$ in the case of target isotope $ZN^{68}$), from which it is ejected by recoil. Being in a different chemical form, the nuclear isomer may be extracted by the well-known Szilard-Chalmers reaction. The chemical step wherein the target isotope is incorporated in a chemical compound is obviously dependent upon the target isotope selected. Various examples of this chemical-incorporating step as well as detailed explanations of this Szilard-Chalmers reaction are described in the literature.

The feasibility of obtaining a coherent stimulated-emission photon-chain-reaction of gamma radiation having been indicated in the heretofore mathematical analysis, specific embodiments of a gamma radiation source apparatus having such output, and a method for producing the apparatus will now be described.

The method for producing the gamma radiation source is illustrated in FIGURE 4 as a flow diagram of the various steps involved. The first step comprises selecting a relatively stable target isotope material that is characterized by a relatively large cross section for producing a particular highly excited energy state of a desired nuclear isomer of the selected isotope. The target isotope material is preferably a separated isotope wherein competing isotopic forms of the target are absent or present in only a small amount.

The desired nuclear isomer to be employed in the gamma radiation source is predetermined and selected in accordance with Equations 16 and 24. The constants of the nuclear isomer which appear in these two equations are tabulated for a number of applicable nuclei in the table of FIGURE 1. Only those isomers producible by neutron irradiation with upper state lifetimes, $\tau_2$, in excess of approximately ten hours are considered therein. The isomers are listed by rows and the important characteristics are listed by columns. Columns 2 through 6 deal with production of the desired isomer, and columns 5 through 13 deal with properties that are pertinent to the critical condition, Equations 16 and 24.

Column 1 lists applicable isomers. Column 2 lists the target isotope. Column 3 lists the cross section for producing the upper-level isomeric state, $\sigma_2$, and column 4 the cross section for producing the lower-level isomeric state, $\sigma_1$. Column 5 lists the half life of the upper-level isomeric state and column 6 the half life of the lower-level isomeric state where half life=0.693 mean lifetime. Column 7 lists the energy difference between the two levels, and hence the approximate energy of the emitted gamma photon $E_{21}$. Column 8 lists the branching ratio $\beta$. Column 9 lists the internal conversion coefficient $\alpha$. Column 10 lists the statistical weight $g_2$ of the upper-level state and column 11 the statistical weight $g_1$ of the lower-level state. Column 12 lists the maximum value of the resonance cross section $\sigma$. Column 13 lists the non-resonant absorption cross section $\sigma_0$.

FIGURE 3 is a graph illustrating three properties of an upper excited state of selected nuclear species and the power necessary to maintain an inverted population thereof. The vertical scale at the left represents the mean lifetime, $\tau_2$, of the upper excited state, and the scale at the bottom represents the transition or excitation energy $E_{21}$, or gamma ray energy released or absorbed in a transition between the upper and the lower state. The power required to maintain a population inversion of the upper and lower excited states is indicated by the diagonal lines accompanying the scale at the right of the graph. This is equal to the power released by spontaneous emission in a just-inverted specimen of unit volume. The scale at the right thus represents the power of narrow bandwidth radiation per cubic centimeter of the nuclear isomer required to maintain a population inversion by absorption of radiation. This power is directly proportional to the concentration of atoms $N_2$ per unit volume in the upper energy state and the energy released per decay from this upper state $E_{21}$, and is inversely proportional to the mean lifetime, $\tau_2$, of the upper isomeric state.

Reference to FIGURE 3 clearly indicates that the species to be utilized as a gamma radiation source is preferably to be selected from among the ordinary gamma emitting nuclear isomers in the upper right hand portion of the graph. It should be appreciated that an isomer with long lifetime $\tau_2$, permits storage of the gamma radiation source subsequent to its utilization. Further, it is desirable that the excitation energy $E_{21}$ be high for production of highly energetic gamma radiation. Finally, the power emitted by spontaneous decay should be as low as possible to prevent undue heating of the source crystal. Reference to the table of FIGURE 1, graph of FIGURE 3, and Equations 16 and 24 indicate that the isomers $Zn^{69}$, $Cd^{113}$, $Xe^{131}$, $Xe^{133}$, $Ba^{135}$, and $Ce^{137}$ possess the desired characteristics for generating a stimulated-emission photon-chain-reaction to a high degree with $Zn^{69}$ being a preferred selection.

The recoil energy from gamma ray emission associated with thermal neutron capture in a typical case such as $Zn^{69}$ is 185 electron volts, more than adequate for chemical bond rupture, and so $Zn^{69}$ can be prepared by the Szilard-Chalmers reaction which includes the simultaneous step of thermal neutron bombardment and chemical isolation or separation whereby a concentrated or highly pure form of the desired nuclear isomer is obtained.

Population inversion, if required, may occur either during the period of irradiation, or at a time thereafter depending on the isotope. In the case of population inversion during irradiation, only the one step of isolating or separating the selected isotope from the remaining substances, which is an inherent part of the Szilard-Chalmers reaction, may be necessary. However, in the case of isotopes in which the population inversion occurs after the irradiation interval, a second repurifying process by chemical isolation must be performed to obtain the selected isomer in its highly pure form, free from its decay products.

The selected nuclear isomer in a highly purified form subsequently undergoes a process whereby a single crystal is grown therefrom. The crystal is preferably of elongated or whisker form, and any one of a number of well-known methods may be employed for growing the crystal. One method consists of dipping a small single crystal seed into the surface of a melt and withdrawing it at a rate which allows a single crystal to develop. If the seed is slightly cooler than the melt, material withdrawn by the seed solidifies as a single crystal.

Other known methods of growing a single relatively perfect crystal are, a capillary tube technique developed by J. Czochralski, and described in Z. PHYS. CHEM. 92, 219 (1918), a horizontal traveling furnace technique developed by B. Chalmers and described in CAN. J. PHYS. 31, 132 (1952), a horizontally or vertically moving crucible technique developed by D. C. Stockbarger and described in REV. SCI. INSTRUM. 7, 133 (1936), a zone melting technique developed by W. G. Pfann and described in J. METALS N.Y. 4, 747, 861 (1952) and a floating zone method described by P. H. Keck and M. J. Golay in PHYS. REV. 89, 1297 (1953). A substantially perfect crystal, that is, a crystal having a negligible impurity concentration and, therefore, a very uniform lattice structure may be obtained by these methods. The preferred geometry of the crystal, namely great elongation in one direction, permits a sharp beam definition of the gamma radiation which is produced and emitted by the obtained photon chain reaction. This sharp definition occurs because the flux density directed generally in the axial direction can be far more intense than in other directions due to the greater average path length in the medium. The elongated geometry achieves an effective multiplication factor whereby any spontaneously arising photon is proliferated by a stimulated emission process to a number of photons, all of which travel with it and emerge simultaneously, interacting only with those nuclei laying in a cylinder of cross-sectional area $\sigma$ along their common path. Only a relatively small number of multiplying bursts of photons may be propagated through the crystal medium before its properties are no longer favorable for multiplying immediately succeeding bursts. Further, the temperature rise which accompanies the beam of photon bursts destroys the immediate usefulness of the crystal in a short time thereby preventing a long sustained output of bursts or pulses of gamma rays.

The single elongated crystal grown from a highly pure form of a selected isotope which may also have a population inversion of energy states should preferably have a property characterized by a high relative probability to undergo a particular mode of lattice vibration in response to absorbed recoil energy corresponding to the momentum of gamma radiation emitted thereform in a direction coinciding with the axis of greatest extension. The crystal must be maintained under predetermined environmental conditions to assure a nonuniform line shift by means of gravitational, Zeeman, or other effects, and thereby prevent premature stimulated emission of gamma radiation therefrom as previously explained. The important environmental conditions to be maintained are temperature, gravitational field, and magnetic field.

The final step for producing the gamma radiation source comprises providing a means for modifying the environmental conditions to thereby initiate the coherent stimulated-emission photon-chain-reaction within the crystal. This means may include a change in one or more of the aforementioned environmental conditions to reduce differences of the line shift in different parts, thereby allowing an initiating spontaneous emission event within the crystal to effect a stimulated emission chain reaction.

Figure 5:
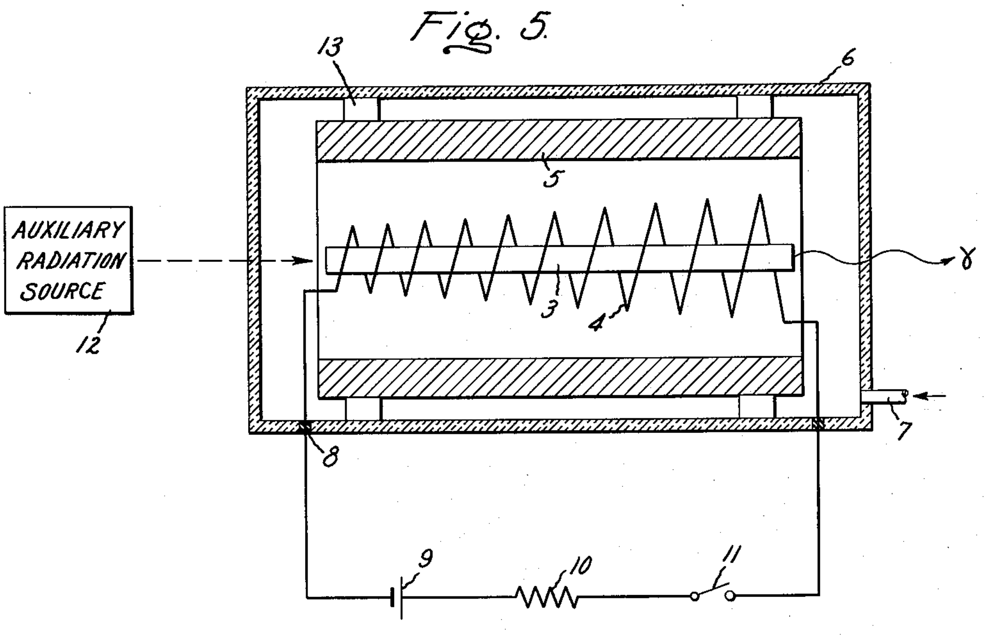
FIGURE 5 illustrates an apparatus for emitting a directional and coherent beam of gamma radiation and constructed in accordance with our invention.

FIGURE 5 illustrates an apparatus wherein a gamma radiating crystal is constructed in accordance with the heretofore described method. An elongated, oriented, single crystal 3, comprised of a highly pure form of the selected nuclear isotope preferably in an inverted population state, is coaxial with a tapered coil 4, of electrically conductive material such as copper or aluminum. A magnetic shield 5 is positioned about crystal 3 and tapered winding 4 to isolate the crystal from extraneous magnetic fields. The entire structure comprising crystal 3, tapered winding 4, and magnetic shield 5 is contained within a heat insulating chamber 6, magnetic shield 5 being connected thereto by any conventional fastening means 13. Magnetic shield 5 may be constructed of any well-known magnetic shielding material such as mu-metal and the walls of heat insulating chamber 6 may be constructed of a ceramic such as magnesia. A source of controlled cold temperature (not shown) introduces cooled medium to the interior of chamber 6 through inlet means 7 at the desired time. The conductors of coil 4 are brought through the walls of the insulating chamber 6 by means of electrical insulating members 8 and connected in an electrical circuit comprising battery 9, resistor 10, and switch 11.

The environmental conditions necessary to prevent premature stimulated emission of the gamma radiation from the crystal are controlled in the following manner. Switch 11 is maintained in a closed position to produce an inhomogeneous magnetic field along the elongated axis of crystal 3 by means of tapered winding 4. The temperature is maintained at a value above the minimum attainable from the cold temperature source. The structure is preferably stored in a position whereby crystal 3 is positioned vertically, thereby being affected by a differential gravity field. To obtain a coherent stimulated-emission photon-chain-reaction from crystal 3, the structure is positioned horizontally thereby reducing any differential gravity field to a minimum, switch 11 is opened to reduce the magnetic field along the crystal to a minimum, and a negative temperature gradient normal to the crystal is applied. The effect of gravitational shift may also be eliminated by employing the structure in an orbiting satellite or freely falling body. The environmental modifying conditions aforementioned reduce the frequency line shift between different nuclei in crystal 3 to a minimum and thereby initiate the coherent stimulated-emission photon-chain-reaction.

An auxiliary radiation source 12 may also be used in conjunction with the aforementioned environmental modifying means. Source 12 may comprise an electron or X-ray beam or other type radiation device, whose output is focused on a first end of crystal 3. Simultaneously initiating the auxiliary radiation source and modifying at least some of the above-mentioned environmental conditions triggers stimulated emission within the crystal which is directed outward from the second end thereof.

As an example of the gamma radiation emitted by the crystal, a crystal having the dimensions one micron diameter and one millimeter long and comprising the nuclear isomer $Zn^{69}$ undergoes $7\times10^8$ disintegrations per second in the form of 435-kilovolt gamma radiation. The absorption coefficient $\mu$ is 0.58 per centimeter, the stimulation coefficient K is 230 per centimeter. The gamma ray intensity in the crystal elongated direction, when a spontaneous emission event occurs at the far end of the crystal, is multiplied by a stimulated-emission photon-chain-reaction having a factor which is the exponential function of 23.

From the foregoing description, it can be appreciated that our invention makes available a new gamma radiation source and a method for producing the radioactive material used therein wherein the source output is derived by means of a directional coherent stimulated-emission photon-chain-reaction. Our source has the advantage that, being comprised of a nuclear isomer, it can be generated by nonradiative processes such as neutron bombardment rather than by radiative or electromagnetic radiation processes which inherently require a great deal more energy. A further advantage is that the generation of the nuclear isotope may occur in an environment separated from that of its eventual use, have a convenient lifetime, and be readily obtained in highly excited and pure forms.

Line displacements, especially those arising from nuclear recoil, become a paramount consideration in the stimulated-emission photon-chain-reaction effect; they eliminate the need for inversion by oppositely displacing the emission and absorption lines and can be utilized for control so that with the requisite crystal and environmental conditions, a highly collimated beam of gamma radiation may be generated therefrom.

Having described a new gamma radiation source, method for producing the radioactive material used therein, and method for generating a directional and coherent beam of gamma radiation by producing a stimulated-emission photon-chain-reaction within a single crystal of a nuclear isomer, it is obvious that modifications and variations of our invention are possible in light of the above teachings. It is, therefore, to be understood that changes may be made in the particular embodiment of our invention described which are within the full intended scope of the invention as defined by the following claims.

What we claim as new and desire to secure by Letters Patent of the United States is:

1. A method for preparing a gamma radiation material comprising the steps of
   selecting a relatively stable target isotope material characterized by a relatively large cross section for producing an upper isomeric state of a desired isotope,
   chemically combining the target isotope to form a particular chemical compound having covalent binding,
   irradiating the target isotope compound with neutron particles thereby rupturing the chemical bond to form substances including the desired isotope wherein a high concentration of the upper isomeric state may be achieved and having a resonance cross section greater than its nonresonant absorption cross section for gamma radiation emitted in transitions between the upper and lower isomeric states,
   isolating the desired isotope from the remaining substances to obtain a highly concentrated form of the desired isotope, and
   growing a whisker shape single crystalline solid structure from the concentrated desired isotope wherein the crystal properties are characterized by a high relative probability for the crystal to undergo a particular mode of vibration in response to absorbed recoil energy corresponding to the momentum of emission of gamma radiation within the crystalline structure.

2. The method set forth in claim 1 wherein the target isotope is $Zn^{68}$ and the desired isotope is $Zn^{69}$.

References Cited by the Examiner

Nuclear Science Abstracts, 17:34986, Oct. 31, 1963, an abstract of a paper presented at the American Nuclear Society 9th Annual Meeting, Salt Lake City, June 1963, On the Possibility of Maser Action Between Nuclear States, Baldwin et al.

Baldwin et al.: On the Possibility of Maser Action Between Nuclear States, Transactions of the American Nuclear Society, 1963 Annual Meeting, Salt Lake City, June 17–19, 1963.

REUBEN EPSTEIN, *Primary Examiner.*

CARL D. QUARFORTH, *Examiner.*

J. V. MAY, *Assistant Examiner.*